US008606187B2

(12) United States Patent
Weil et al.

(10) Patent No.: US 8,606,187 B2
(45) Date of Patent: Dec. 10, 2013

(54) MITIGATION OF UNCOORDINATED INTERFERENCE OF A WIRELESS ACCESS NODE

(75) Inventors: Kevin Weil, Redwood City, CA (US); Peter Behroozi, Stanford, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1465 days.

(21) Appl. No.: 11/897,914

(22) Filed: Aug. 31, 2007

(65) Prior Publication Data

US 2009/0059851 A1    Mar. 5, 2009

(51) Int. Cl.
*H04B 17/00*    (2006.01)
(52) U.S. Cl.
USPC ............ 455/67.11; 455/67.13; 455/63.1; 455/41.1; 455/41.2; 455/41.3; 370/315; 370/320; 370/351; 370/422; 370/423

(58) Field of Classification Search
USPC ........ 455/67.11, 501, 41.1–41.3, 67.13, 63.1; 315/315–320, 351, 422–426
See application file for complete search history.

(56) References Cited

U.S. PATENT DOCUMENTS

| 5,661,727 | A | 8/1997 | Kermani et al. |
| 7,130,289 | B2 | 10/2006 | Kuan et al. |
| 7,184,407 | B1 | 2/2007 | Myles et al. |
| 2005/0213601 | A1 | 9/2005 | Ginzburg et al. |
| 2007/0115907 | A1 | 5/2007 | Myles et al. |
| 2009/0296591 | A1* | 12/2009 | Urabe et al. ............... 370/252 |
| 2011/0019540 | A1* | 1/2011 | Isozu ........................ 370/227 |

* cited by examiner

*Primary Examiner* — Fayyaz Alam
(74) *Attorney, Agent, or Firm* — Brian R. Short

(57) ABSTRACT

An apparatus and method of a wireless node mitigating the effects of uncoordinated interference is disclosed. One embodiment of a method includes the wireless node monitoring uncoordinated interference affecting transmissions of the wireless node, and evaluating a plurality of wireless links, the evaluation influenced at least in part on the monitored uncoordinated interference.

22 Claims, 4 Drawing Sheets

MITIGATION OF UNCOORDINATED INTERFERENCE OF A WIRELESS ACCESS NODE

FIELD OF THE EMBODIMENTS

The described embodiments relate generally to wireless communications. More particularly, the described embodiments relate to a method and apparatus for mitigating uncoordinated interference of a wireless access node.

BACKGROUND

Wireless networks typically allow a wireless device to connect to the wireless networks through a base station or access point that is wired to the network. Wireless mesh networks can additionally include access points that are wirelessly connected to the network. The wireless device can transmit data packets that are received by the base station or access point and then routed through the network. The wireless network can include many base stations or access points that are each wired to the network.

Wireless networks include wireless links that are susceptible to interference. Wireless mesh networks typically include many wireless links, and therefore, can be particularly susceptible to interference. One form of interference is self interference, in which a wireless link within the wireless mesh network receives interfering signals from other wireless links of the wireless mesh network. As packets are relayed through the wireless mesh network, they can suffer from the effects of self-interference, and/or they may cause self-interference for other links within the wireless mesh network.

One wireless network configuration that results in a form of self-interference has been termed the "hidden node" condition. A hidden node condition can result when two separate wireless nodes are communicating with a third node, but cannot receive each others transmission. That is, the third node can receive signals from each of the two separate wireless nodes, but the wireless nodes cannot receive transmission signals from each other. As a result, transmissions from each of the two separate nodes to the third node can interfere with each other. Hidden node conditions are not limited to, but can be particularly problematic in wireless mesh networks that include many wireless nodes in relatively close proximity with each other.

Wireless nodes can also suffer from uncoordinated interference that is not self-interference. That is, the wireless nodes can also receive uncoordinated interference from devices outside of the wireless network.

It is desirable to have a method and apparatus for mitigating uncoordinated interference in a wireless network.

SUMMARY

One embodiment includes a method of a wireless node mitigating uncoordinated interference. The method includes the wireless node monitoring uncoordinated interference affecting transmissions of the wireless node, and evaluating a plurality of wireless links, the evaluation influenced at least in part on the monitored uncoordinated interference.

Another embodiment includes a method of mitigating uncoordinated interference of a wireless mesh network. The method includes each wireless access node of the wireless mesh network monitoring uncoordinated interference affecting transmissions of the wireless access node. Each wireless access node evaluates information channels, the evaluation influenced at least in part on the monitored uncoordinated interference. Each wireless access node broadcasts the monitored uncoordinated interference to neighboring wireless nodes.

Other aspects and advantages of the present invention will become apparent from the following detailed description, taken in conjunction with the accompanying drawings, illustrating by way of example the principles of the invention.

DETAILED DESCRIPTION

Figure 1:
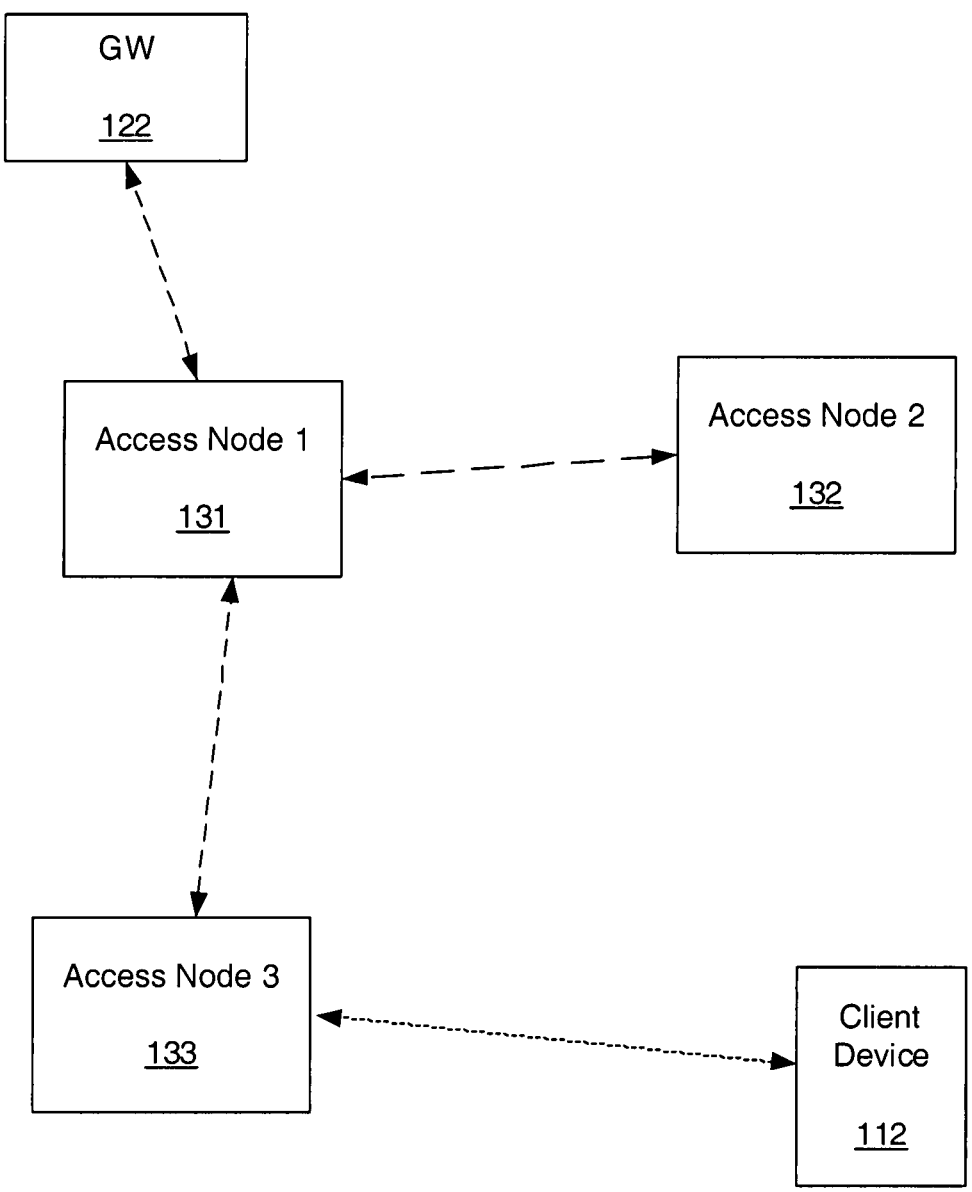
FIG. 1 shows an example of wireless access nodes that suffer from uncoordinated interference.

As shown in the drawings for purposes of illustration, the described embodiments provide methods and systems for characterizing uncoordinated interference. Wireless networks, and in particular, wireless mesh networks can suffer from interference due to uncoordinated sources. The described embodiments characterize uncoordinated interference, and some embodiments include wireless nodes adjusting their operations based upon the characterized uncoordinated interference.

Uncoordinated Interference

FIG. 1 shows an example of a wireless network that includes interconnected wireless access nodes 122, 131, 132, 133, and a client device 112. One of the access nodes is shown as a gateway 122. The gateway 122 can be connected, for example, to another network. Generally, the access nodes that have the best link quality between each other are wirelessly connected. However, conditions can occur in wireless networks in which two or more nodes can communicate with a target node, but cannot communicate within each other. In this situation, the two or more nodes can interfere with each other while attempting to communicate with the target node.

For example, access node 132, and access node 133 can have wireless connections to access node 131, but not each other. As a result, signals transmitted from the access nodes 132 and 134 can interfere with each other when the two nodes are simultaneously attempting to transmit signals to the access node 131. The signals transmitted from one of the access nodes 132, 133 appears as uncoordinated interference to the other of the access nodes 132, 133.

Additionally, each of the access nodes 131, 132, 133 can receive uncoordinated interference from devices other than nodes in the network. The uncoordinated interference can effectively result in poor wireless links between each of the access nodes 132, 133 and the wireless access node 131.

If left uncontrolled, the uncoordinated interference can reduce the throughput of the wireless network. Uncoordinated interference having its source within the network can be controlled by either modifying the operation of the receiving (interfered) device, or by modifying the operation the transmitting device. Uncoordinated interference having its source outside of the wireless network may be controlled to some extent by modifying the operation of the receiving devices or the operation of the wireless network.

Wireless Mesh Network

Figure 2:
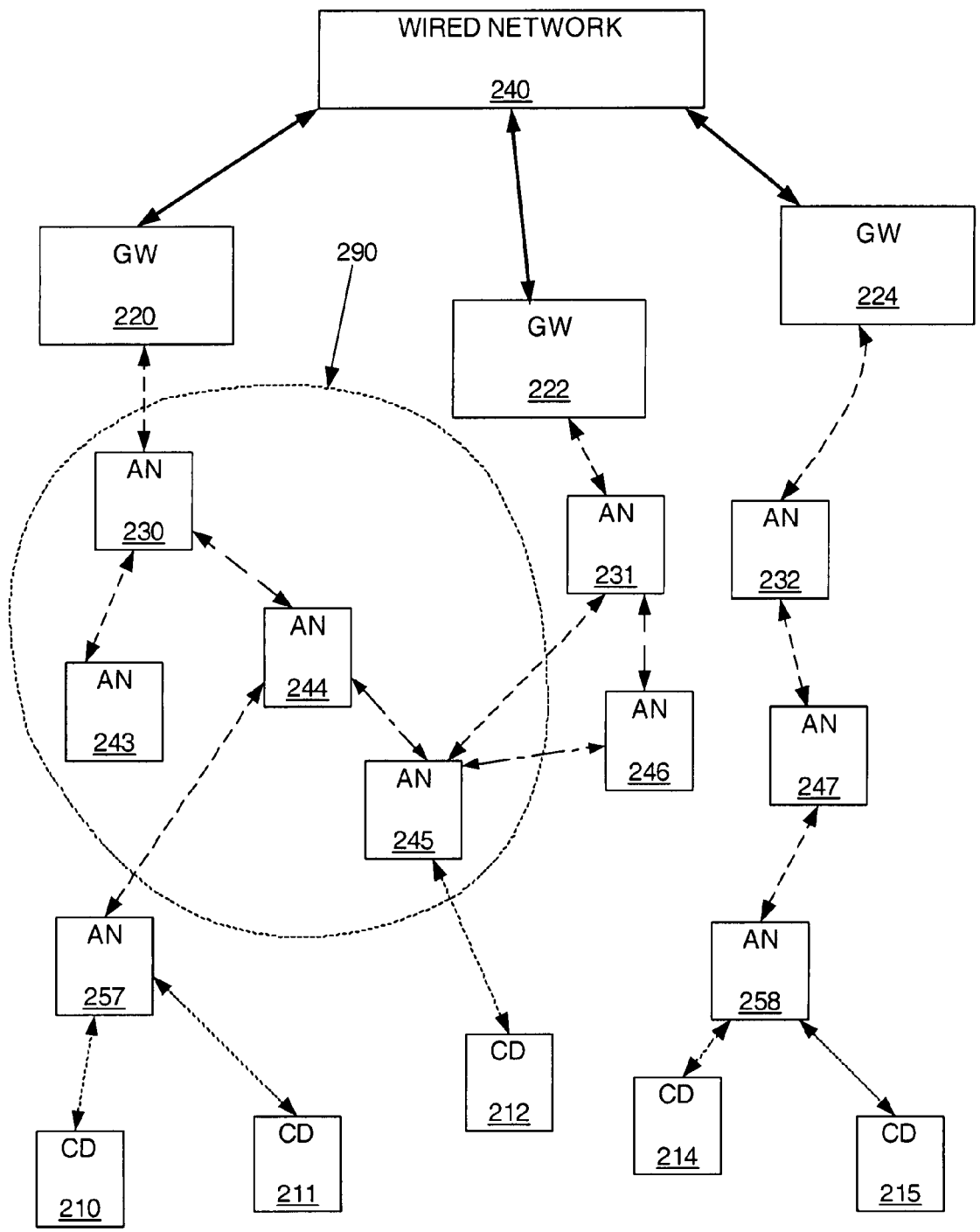
FIG. 2 shows an example of a wireless mesh network that can utilize methods of mitigating uncoordinated interference.

FIG. 2 shows an example of a wireless mesh network that can utilize methods of characterizing uncoordinated interference. The wireless mesh network includes gateways 220, 222, 224, access nodes 230, 231, 232, 243, 244, 245, 246, 247, 257, 258 and client devices 210-215. The wireless access nodes 230, 231, 232, 243, 244, 245, 246, 247, 257, 258 interconnect with each other, and with gateways 220, 222, 224 to form a mesh.

One embodiment of a gateway originates routing beacons that the access nodes can use to select routes to at least one gateway based on a persistence of successfully received routing beacons. The gateways typically include a backhaul (wired or wireless) to a wired network 240 that provides access to the internet.

An access node can generally be defined as being a device that a client device can associate with to obtain access to the mesh network, and therefore, access the internet. Typically, a gateway can additionally operate as an access node. As will be described, one embodiment of an access node re-broadcasts successfully received routing beacons (from either an upstream gateway or access node) after attaching uncoordinated interference information of the access node.

A client can include a laptop computer, a personal digital assistant (PDA), a cell-phone, or any other device that includes an interface adaptable for use with the mesh network. The client can access the network though wired or wireless connections.

The access nodes 230, 231, 232, 243, 244, 245, 246, 247, 257, 258 form routing paths through the wireless mesh network. Client devices 210-215 wirelessly connect to any one of the gateways 220, 222, 224 or access nodes 230, 231, 232, 243, 244, 245, 246, 247, 257, 258 to obtain a data path to the wired network 240. An embodiment of the access nodes selects routing paths to at least one gateway based on a persistence of successfully received routing beacons, and on air-time usage information included within the routing beacons.

For the description here, the air-time usage indicates air-time that is occupied (used) by signals having a power level above a threshold. The signals can be either receive or transmit signals and are typically defined by a specific wireless node. For a node, the air-time usage indicates air-time that is occupied by signals transmitted by the wireless node itself, signal transmitted by neighboring wireless nodes, and signals transmitted by other devices that may not be a part of the wireless network of the wireless node. It is to be understood that the description could alternatively include air-time availability rather than air-time usage.

The example of a wireless mesh network of FIG. 2 includes the three gateways 220, 222, 224. Each gateway 220, 222, 224 defines a cluster. For example, a first cluster of the gateway 220 includes access nodes 230, 243, 244, 257. A second cluster of the gateway 222 includes access nodes 231, 245, 246. A third cluster of the gateway 224 includes the access nodes 232, 247, 258.

Due to the interconnectivity present in any mesh network, activities or conditions of one part of the mesh network can influence the operation of other parts of the mesh network. Additionally, the interconnections are wireless links, and therefore, the air-time occupied by wireless links of each of the access nodes 230, 231, 232, 243, 244, 245, 246, 247, 257, 258 and client device 210-215 can affect the operation of other devices of the mesh network because air-time is shared among all interfering links.

Depending upon the physical locations of the access nodes, certain access nodes are more likely to interfere with other nodes of the wireless network. Neighbor nodes can be defined as other nodes that can receive signals from a node, wherein the received signals at least have a predetermined signal strength. Neighboring nodes can be a source of self-interference, and can cause the air-time available to a node to fall below desirable levels.

Wireless communication between the nodes occupies air-time. Air-time is additionally occupied when client devices 210-215 are connected to the wireless mesh network. The time occupied by each client device connection is generally not equal. That is, the air-time occupied can vary greatly from client device to client device. Generally, the air-time occupied by a client device is dependent upon the qualities of the links between the client device and the gateway the client device is routed to, and the number of wireless hops (a hop is a wireless link) between the client device and the gateway. The more wireless hops a client device or node is away from a gateway, the greater the effect a client device or node can have on the available air-time capacity. That is, each link between the client device or node and the connecting gateway occupies air-time.

Generally, a range (such as a range 290 indicated around access node 244) exists around an access node such that wireless links within this range can reduce the air-time available to the access node. Medium access protocols, such as IEEE 802.11, implement Carrier Sense Multiple Access with Collision Avoidance (CSMA/CA). In such protocols, transceivers sense a channel's status and defer transmissions while the channel is considered to be busy. The channel is deemed to be busy if a received signal exceeds a Clear Channel Assessment Threshold (CCAT). Therefore, if the access node is receiving transmitted signals from at least one wireless device, the access node may be unable to either transmit any signal or receive any signal from another wireless device. As such, at some point the available air-time can become so limited that the access node cannot properly operate within the wireless mesh network.

An embodiment includes each access node and gateway within the wireless mesh network monitoring its air-time usage and exchanging its air-time usage with it neighboring access nodes and gateways. Based on the monitored and exchanged air-time usage, each access node can estimate its susceptibility to uncoordinated interference. One method of exchanging the monitored uncoordinated interference includes each access node broadcasting the monitored uncoordinated interference to neighboring wireless nodes. The broadcast uncoordinated interference information can be included within the broadcast or re-broadcast routing beacons.

As previously described, an embodiment of the access nodes of the wireless mesh network re-broadcasts successfully received routing beacons. The routing beacons can also be used for broadcasting the monitored uncoordinated interference by attaching the monitored uncoordinated interference to the routing beacons. Therefore, each wireless access node can evaluate alternate wireless links while considering the uncoordinated interference of the neighboring access node of the alternate wireless links. That is, each wireless node receives routing beacons from a plurality of neighboring nodes and evaluates the quality of wireless links between the wireless node and each of the plurality of neighboring nodes based on the received routing beacons, and the monitored uncoordinated interference. Once the access node has selected an upstream node, beacons received from the upstream node can be modified by adding the monitored uncoordinated interference of access node, and re-broadcast. Therefore, downstream access nodes can make routing selections based at least in part on the monitored uncoordinated interference of the access node.

It should be observed that embodiments of the access node broadcast the routing beacons over multiple transmission channels (multiple information channels). Therefore, downstream access nodes can select routing paths based on monitored uncoordinated interference of upstream nodes over multiple transmission channels.

Figure 3:
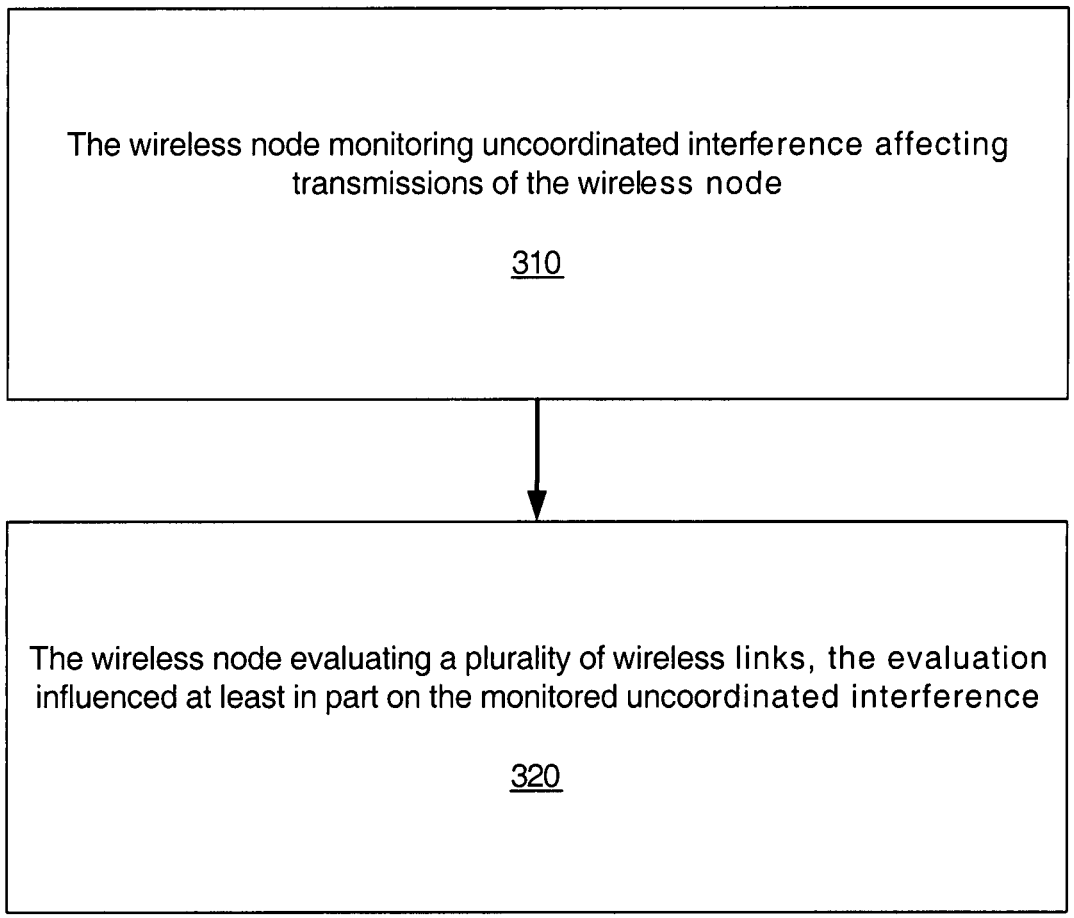
FIG. 3 is a flow chart that shows an example of steps of a method of a wireless access node within a network mitigating uncoordinated interference.

FIG. 3 is a flow chart that shows an example of steps of a method of a wireless access node within a network characterizing uncoordinated interference. A first step 310 includes the wireless node monitoring uncoordinated interference affecting transmissions of the wireless node. A second step 320 includes the wireless node evaluating a plurality of wireless links, the evaluation influenced at least in part on the monitored uncoordinated interference. The wireless node evaluating a plurality of wireless links can include the wireless node evaluating information channels.

Monitoring Uncoordinated Interference

The uncoordinated interference can be monitored by the wireless access node exchanging information with its neighboring devices. Each wireless access node of a wireless network can monitor all of its neighboring wireless access nodes. That is, within the network, wireless access node maintain a list of the other wireless access nodes in which each wireless access node can receive signals having a power level above a threshold. The list can then be exchanged with neighboring wireless access nodes, allowing each node to determine where hidden node conditions may exist.

For other embodiments, the information exchanged between access nodes includes more intelligence than just a list. For example, an embodiment includes each access node of the wireless network monitoring air-time usage histories. Once collected, the air-time usage histories can be exchanged between the access nodes, allowing each access node to synchronize its air-time usage history with its neighboring access nodes air-time usage history. Each access node can then, based off of the air-time usage histories, project and time future transmissions. Based on the air-time usage history of each of the access node's neighboring nodes, the access node can identify periods of uncoordinated interference.

The evaluation of wireless links can include evaluating signals transmitted from different neighboring devices, or from the same device, but over a different information channels. An information channel can be defined as any means by which a sender (transmitter) may communicate information to at least one receiver. Two information channels are identical if and only neither the sender nor the receiver(s) can distinguish between the two channels in any of the sender's or receivers' configurable modes.

The wireless node evaluates the plurality of available wireless links by estimating an impact of at least one uncoordinated interference mitigation technique on each of the plurality of links. The link that suffers the least from the uncoordinated interference when applying the mitigation techniques can be selected.

Estimating an Impact Mitigation Techniques

The impact of the uncoordinated interference can be estimated in several different ways. Some examples of estimating the impact can include evaluating or estimating a latency, throughput or reliability of each of the plurality of links while applying each of the mitigation techniques. The impact estimation can be performed on each of the links while using at least one of the uncoordinated interference mitigation techniques.

One embodiment of estimating a latency of a link or links includes sending a probe packet from the access node to a first target device located a first number of wireless hops from the access node, having the first target device send a response packet back to the access node, and measuring the round trip travel time of the probe-response pair of packets. The access node can locate latency network conditions by then sending another probe packet from the access node to second target device located a second number of wireless hops from the access node, and comparing the round trip travel time for probe packets of the first and second target devices.

One embodiment of estimating a throughput (upstream) network condition test includes sending as many data packets as possible during a predetermined length of time (for example, 2 seconds) from the access node to the first target device located a first number of hops away, and measuring the number of packets sent. Packets that fail to be received by the first target device can be retried (transmitted again) if an acknowledgement (ACK) is not received by the sender (the access node). The measured number of packets sent is multiplied by the bytes/packet, and divided by the predetermined length of time to obtain the throughput between access node and the first target device. The same process may be repeated with a second target device located a second number of wireless hops away from the access node to obtain the throughput between the access node and the second target device.

A downstream throughput test can be tested using methods similar to the upstream throughput test. However, the first and second target devices can be instructed to send as many data packets as possible during the predetermined length of time (for example, 2 seconds) from the target devices to the access node. Packets that fail to be received by the access node are retried (transmitted again) because an acknowledgement (ACK) is not received by the target device. The measured number of packets sent is multiplied by the bytes/packet, and divided by the predetermined length of time by both the first target device and the second target device to obtain the throughput between target devices and the access node.

One embodiment of a packet retry test includes the access node transmitting, for example, 802.11 protocol unicast packets. The unicast packets must receive an ACK, otherwise, the unicast packets are resent (retried). The number of retries can be counted for unicast packets sent to both the first target device and the second target device. The results can be compared to locate a network condition, such as, number of packet retries.

Mitigation Techniques

As previously described, the impact of the uncoordinated interference mitigation techniques on each of the plurality of links can be estimated or measured. Examples of mitigation techniques that can be enabled while determining the impact of the uncoordinated interference on each of the available links includes setting RTS/CTS (request to send/clear to send) modes of devices at each end of the plurality of links, varying routing selections of the wireless access node, varying transmission power levels from the wireless access node, varying transmission bit rates of the wireless access node, and/or controlling a network parameter of another device within the network.

Enabling the RTS/CTS mode can mitigate the effects of uncoordinated interference because transmissions are to some extent timed to reduce interference. That is, the RTS/CTS mode reduces interference by having nodes on each end of a link indicating a desire and approval of transmissions. This additional scheduling and control can reduce the effects of interference.

Varying the routing selection of the wireless access node can mitigate the effects of uncoordinated interference because, for example, hidden node conditions can be eliminated, or at least avoided. As previously described, wireless mesh networks provide an environment in which self-interference and hidden node conditions are very likely to occur. However, intelligent routing through the wireless mesh network can be used to mitigate hidden nodes if hidden node conditions are monitored, and the routing adapts to the monitored conditions. Links between nodes that suffer from interference can be avoided (routed around), and links that cause uncoordinated interference can be avoided (routed around).

Varying the routing selection can, but not necessarily, include selection of a different information channel. Changing the information channel of a transmission link of the wireless access node can eliminate or avoid the effects of uncoordinated interference. That is, an information channel that suffers from the effects of uncoordinated interference can be avoided, and an information channel that does not suffer as much from uncoordinated interference can be selected.

Varying the transmission power of the wireless access node can mitigate the effects of uncoordinated interference in a couple of ways. If the wireless access node increases its transmission power, the effects of uncoordinated interference on the transmission signals of the wireless access node are most likely reduced. If the wireless access node decreases its transmission power, its transmission signals are less likely to be perceived as uncoordinated interference by another wireless access node.

Varying the transmission bit rates of the wireless access node can mitigate the effects of uncoordinated interference because, for example, a reduction in transmission bit rate can reduce the amount of air-time required by the access node for data transmission. Therefore, the data transmissions are less likely to suffer from interference. Additionally, reducing the air-time occupied by transmission of the wireless access node reduces the possibility of the wireless access node creating uncoordinated interference for other devices.

Another embodiment includes the wireless access node controlling a network parameter of another device within the network. The network parameter can include the RTS/CTS modes of the device, varying routing selections of the device, varying transmission power levels of the device, and/or varying transmission bit rates of the device. Additionally, the device can vary its information channel selection, and/or rate limit by for example limiting its air-time usage or limiting its data traffic. Each of these network parameters (individually or in combination) can be adjusted and/or varied and the impact of each on each of the plurality of links can be estimated or measured. For example, the access node 244 can instruct or control a different access node or gateway (such as, access node 230 or access node 231) to vary its RTS/CTS modes, its routing selections, its transmission power levels, its transmission bit rates, or its information channel selection. The affects of one or more of the parameters on the monitored uncoordinated interference of the wireless node can be observed. The desired parameter selections can be made based at least partially on the observations.

Link Selection

As previously described, the wireless node evaluates a plurality of wireless links, wherein the evaluation is influenced at least in part on the monitored uncoordinated interference. An embodiment includes selecting an alternate wireless link if the alternate wireless link is evaluated to be better than a present wireless link, and retaining a present link if no alternate wireless link is evaluated to be better.

Broadcasting Uncoordinated Interference

In order for each access node to estimate the uncoordinated inteference, the wireless access node needs information from its neighboring nodes. In order for each access node to obtain this information, each the wireless node can broadcast, for example, a list of its neighboring nodes to each of its neighboring wireless nodes. Each node can received this information and estimate its own uncoordinated interference.

Figure 4:
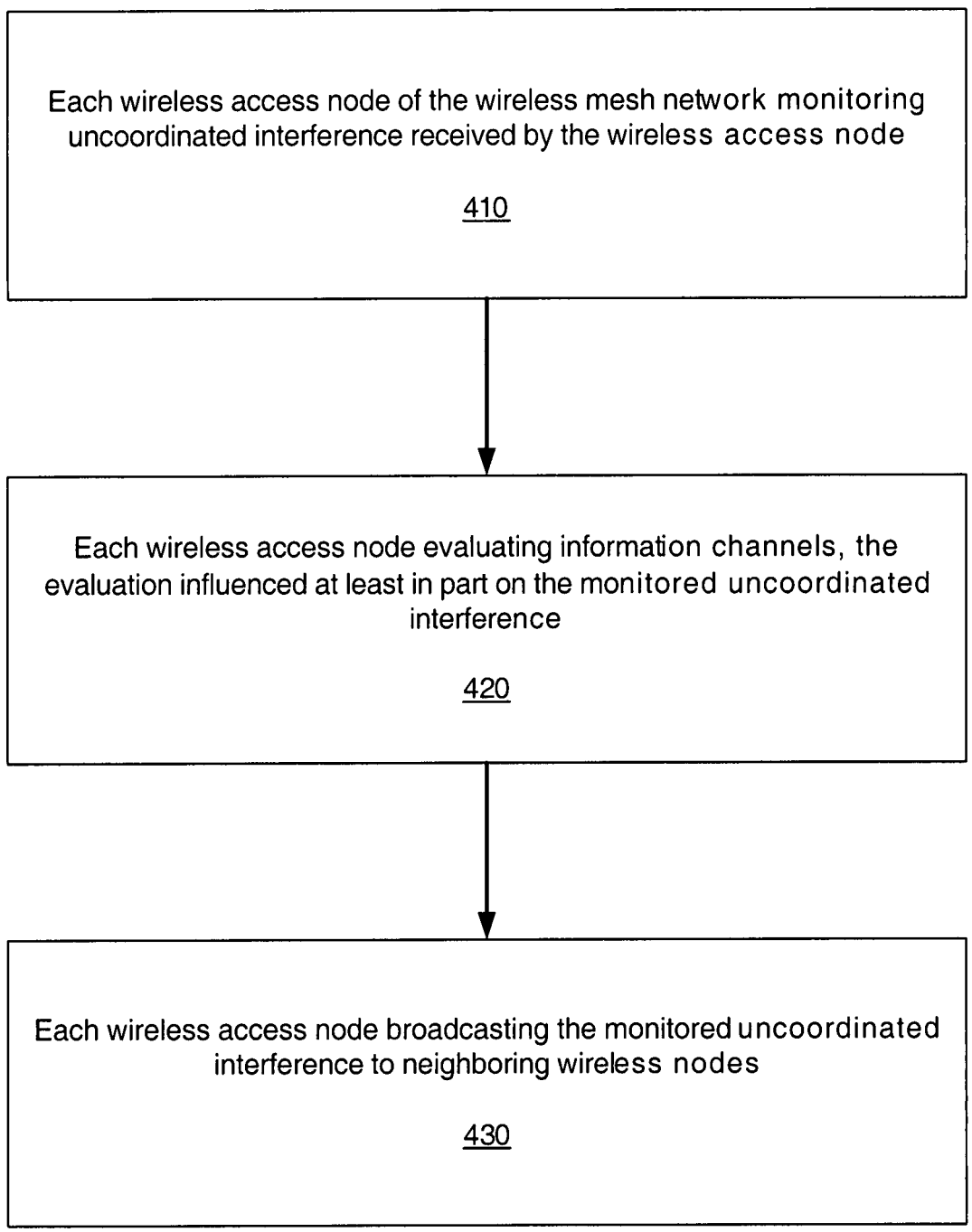
FIG. 4 is a flow chart that shows an example of steps of a method of mitigating uncoordinated interference of a wireless mesh network.

FIG. 4 is a flow chart that shows an example of steps of a method of mitigating uncoordinated interference of a wireless mesh network. A first step 410 includes each wireless access node of the wireless mesh network monitoring uncoordinated interference received by the wireless access node. A second step 420 includes each wireless access node evaluating information channels, the evaluation influenced at least in part on the monitored uncoordinated interference. A third step 430 includes each wireless access node broadcasting the monitored uncoordinated interference to neighboring wireless nodes.

The monitored uncoordinated information can be used within the wireless mesh network to influence routing selections of each of the wireless access nodes of the wireless mesh network. An embodiment includes attaching the monitored uncoordinated interference to routing beacons broadcast by the wireless node. The wireless access node can evaluate alternate wireless links by receiving routing beacons from a plurality of neighboring nodes, and evaluate the quality of wireless links between the wireless node and each of the plurality of neighboring nodes based on the received routing beacons, and the monitored uncoordinated interference. That is, as previously described, routing paths from each access node to a gateway can be selected based on qualities of routing beacons received from neighboring (upstream) access nodes. As described, the persistence of successfully received routing beacons can be used to influence the routing selections. Additionally, the monitored uncoordinated interference of each access node can be included within the routing beacons, and therefore, also used to influence the routing selections. Downstream access nodes can preferentially avoid upstream wireless access nodes that suffer from unacceptable amounts of uncoordinated interference.

Additionally, the wireless access nodes re-broadcast the routing beacons received from a one of the plurality of neighboring nodes with a selected link after attaching their own monitored uncoordinated interference information to the routing beacons. The routing beacons can be received over multiple information channels, and the modified routing beacons can be re-broadcast over multiple information channels. That is, for example, the routing beacons can be received over different channels having different transmission frequencies, and the modified routing beacons can be re-broadcast over multiple channels having different transmission frequencies.

The wireless node can be within a wireless mesh network. Evaluating wireless links can include the wireless node receiving routing beacons from a plurality of neighboring nodes, and evaluating the quality of wireless routing paths between the wireless node and wireless mesh network gateways associated with each of the plurality of neighboring nodes based on a quality (for example, persistence of successfully received routing beacons) of the received routing beacons, and the monitored uncoordinated interference.

Although specific embodiments have been described and illustrated, the described embodiments are not to be limited to the specific forms or arrangements of parts so described and illustrated. The described embodiments are limited only by the appended claims.

What is claimed:

1. A method of a wireless node mitigating effects of uncoordinated interference, comprising:
   monitoring, by the wireless node, uncoordinated interference affecting transmissions of the wireless node; and
   evaluating, by the wireless node, a plurality of wireless links, the evaluation influenced at least in part on the monitored uncoordinated interference;
   selecting, by the wireless node, a routing path to a gateway based on the evaluation of the wireless links, the selected routing path avoiding links that cause uncoordinated interference, thereby mitigating the effects of uncoordinated interference.

2. The method of claim 1, wherein the wireless link comprises an information channel to a neighboring device.

3. The method of claim 1, wherein the wireless node evaluating a plurality of wireless links comprises estimating an impact of at least one uncoordinated interference mitigation technique on each of the plurality of links.

4. The method of claim 3, wherein estimating an impact of at least one uncoordinated interference mitigation technique on each of the plurality of links comprises:
   estimating or measuring the impact of uncoordinated interference on each of the plurality of links while using RTS/CTS modes for at least one transmission direction of at least one device of at least one of the plurality of links.

5. The method of claim 3, wherein estimating an impact of at least one uncoordinated interference mitigation technique on each of the plurality of links comprises:
   estimating or measuring the impact of uncoordinated interference on each of the plurality of links for various routing selections of the wireless access node.

6. The method of claim 3, wherein estimating an impact of at least one uncoordinated interference mitigation technique on each of the plurality of links comprises:
   estimating or measuring the impact of uncoordinated interference on each of the plurality of links for various transmission power levels from the wireless access node.

7. The method of claim 3, wherein estimating an impact of at least one uncoordinated interference mitigation technique on each of the plurality of links comprises:
   estimating or measuring the impact of uncoordinated interference on each of the plurality of links for various transmission bit rates of the wireless access node.

8. The method of claim 3, wherein estimating an impact of at least one uncoordinated interference mitigation technique on each of the plurality of links comprises:
   estimating or measuring the impact of uncoordinated interference on each of the plurality of links while controlling a network parameter of another device within the network.

9. The method of claim 3, wherein estimating an impact of at least one uncoordinated interference mitigation technique on each of the plurality of links comprises evaluating or estimating a throughput of each of the plurality of links while using at least one of the uncoordinated interference mitigation techniques.

10. The method of claim 3, wherein estimating an impact of at least one uncoordinated interference mitigation technique on each of the plurality of links comprises evaluating or estimating a reliability for each of the plurality of links while using at least one of the uncoordinated interference mitigation techniques.

11. The method of claim 3, wherein estimating an impact of at least one uncoordinated interference mitigation technique on each of the plurality of links comprises evaluating or estimating a latency of each of the plurality of links while using at least one of the uncoordinated interference mitigation techniques.

12. The method of claim 1, wherein the selected routing path comprises an alternate wireless link if the alternate wireless link is evaluated to be better than a present wireless link.

13. The method of claim 1, wherein the selected routing path retains a present link if no alternate wireless link is evaluated to be better.

14. The method of claim 1, further comprising the wireless node broadcasting the monitored uncoordinated interference to neighboring wireless nodes.

15. The method of claim 14, wherein broadcasting the monitored uncoordinated interference comprises:
   attaching the monitored uncoordinated interference to routing beacons broadcast by the wireless node; wherein other wireless nodes select routing paths to the gateway through the wireless node based on the routing beacons.

16. The method of claim 1, wherein the wireless node evaluating alternate wireless links comprises the wireless node receiving routing beacons from a plurality of neighboring nodes, and evaluating the quality of wireless links between the wireless node and each of the plurality of neighboring nodes based on the received routing beacons, and the monitored uncoordinated interference.

17. The method of claim 16, further comprising the wireless node re-broadcasting routing beacons received from one of the plurality of neighboring nodes with a selected link after attaching monitored uncoordinated interference information to the routing beacons.

18. The method of claim 16, further comprising the plurality of neighboring nodes attaching monitored uncoordinated interference as observed by each of the plurality of neighboring nodes within the routing beacons broadcast by each of the neighboring nodes.

19. The method of claim 16, wherein the routing beacons are received over a plurality of different transmission channels, wherein the selected routing path comprises a transmission channel that is evaluated to be better than a previous transmission channel.

20. The method of claim 1, wherein the wireless node is within a wireless mesh network, and evaluating wireless links comprises the wireless node receiving routing beacons from a plurality of neighboring nodes, and evaluating the quality of wireless routing paths between the wireless node and wireless mesh network gateways associated with each of the plurality of neighboring nodes based on the received routing beacons, and the monitored uncoordinated interference.

21. A method of mitigating uncoordinated interference of a wireless mesh network, comprising:
   each wireless access node of the wireless mesh network monitoring uncoordinated interference affecting transmissions of the wireless access node;
   each wireless access node evaluating information channels, the evaluation influenced at least in part on the monitored uncoordinated interference; and
   each wireless access node broadcasting the monitored uncoordinated interference to neighboring wireless nodes;
   each wireless access node selecting a routing path to a gateway based on the evaluation of the information channels, the selected routing path avoiding links that cause uncoordinated interference, thereby mitigating the effects of uncoordinated interference.

22. A wireless node, comprising:

means for monitoring uncoordinated interference affecting transmissions of the wireless node; and means for evaluating a plurality of wireless links, the evaluation influenced at least in part on the monitored uncoordinated interference;

means for selecting a routing path based on the evaluation of the plurality of wireless links, the selected routing path avoiding links that cause uncoordinated interference, thereby mitigating the effects of uncoordinated interference.

* * * * *